United States Patent
Edwards (10) Patent No.: US 10,832,567 B2
(45) Date of Patent: Nov. 10, 2020

(54) SYSTEMS AND METHODS FOR GENERATING COMPOSITE REAL-TIME TRAFFIC IMAGES BASED ON TRIGGERING EVENTS USING DATA FROM VEHICLE BORNE SENSORS

(71) Applicant: Toyota Motor North America, Inc., Plano, TX (US)

(72) Inventor: Michael C. Edwards, McKinney, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 112 days.

(21) Appl. No.: 16/165,815

(22) Filed: Oct. 19, 2018

(65) Prior Publication Data

US 2020/0126404 A1    Apr. 23, 2020

(51) Int. Cl.
| G08G 1/01 | (2006.01) |
| G06K 9/00 | (2006.01) |
| H04N 7/18 | (2006.01) |
| G06T 11/60 | (2006.01) |

(52) U.S. Cl.
CPC ....... *G08G 1/0112* (2013.01); *G06K 9/00791* (2013.01); *G06T 11/60* (2013.01); *H04N 7/188* (2013.01)

(58) Field of Classification Search
None
See application file for complete search history.

(56) References Cited

U.S. PATENT DOCUMENTS

| 6,469,621 | B1 | 10/2002 | Vredevoogd et al. |
| 9,873,293 | B2 | 1/2018 | Singh |
| 9,963,132 | B2 | 5/2018 | Singh |
| 9,963,146 | B2 | 5/2018 | Kanwar et al. |
| 10,005,326 | B2 | 6/2018 | So et al. |
| 2017/0132923 | A1* | 5/2017 | Li .................. G08G 1/0112 |
| 2018/0222260 | A1 | 8/2018 | Xue et al. |

FOREIGN PATENT DOCUMENTS

| FR | 2970210 B1 | 8/2013 |
| KR | 101516264 B1 | 5/2015 |
| KR | 101741730 B1 | 6/2017 |

OTHER PUBLICATIONS

"B.alert TPMS tyre management"; http://www.balert.be/en/products/tpms/; Aug. 21, 2018.

* cited by examiner

*Primary Examiner* — Dov Popovici
(74) *Attorney, Agent, or Firm* — Dinsmore & Shohl LLP (57) ABSTRACT

A method of generating composite image data using a first vehicle including a first camera and first network interface hardware and a second vehicle including a second camera and second network interface hardware includes establishing an external connection between the first vehicle and the second vehicle with the first network interface hardware and the second network interface hardware, generating a triggering event signal in the first vehicle in response to a triggering event, sending the triggering event signal to the second vehicle, capturing first image data using the first camera and capturing second image data using the second camera, and stitching the first image data and the second image data into composite image data.

20 Claims, 4 Drawing Sheets

SYSTEMS AND METHODS FOR GENERATING COMPOSITE REAL-TIME TRAFFIC IMAGES BASED ON TRIGGERING EVENTS USING DATA FROM VEHICLE BORNE SENSORS

TECHNICAL FIELD

The present specification generally relates to systems and methods for generating images of traffic and, more specifically, to systems and methods for generating composite real-time traffic images based on triggering events using data from vehicle-borne sensors.

BACKGROUND

Existing in-vehicle traffic monitoring services may provide reports that are delayed and/or only a schematic representation. For example, traffic monitoring services may indicate light, medium, or heavy traffic using various colored lines (e.g., a green, yellow, or red line, respectively), on a navigation device. Moreover, these services may not be selectively or automatically actuated and the services may expend resources monitoring roadways and/or traffic patterns unnecessarily (e.g., in light or negligible traffic). Accordingly, vehicles lack a capability to efficiently monitor traffic patterns visually in real time. Moreover, individual vehicles may lack sufficient processing power to generate, process, and transmit a composite real-time image of a traffic pattern. Accordingly, networks that shift processing requirements from an individual vehicle to external vehicles and/or network infrastructure may be required to generate composite real-time traffic images based on triggering events using data from vehicle-borne sensors.

SUMMARY

In one embodiment, a method of generating composite image data using a first vehicle including a first camera and first network interface hardware and a second vehicle including a second camera and second network interface hardware includes establishing an external connection between the first vehicle and the second vehicle with the first network interface hardware and the second network interface hardware, generating a triggering event signal in the first vehicle in response to a triggering event, sending the triggering event signal to the second vehicle, capturing first image data using the first camera and capturing second image data using the second camera, and stitching the first image data and the second image data into composite image data.

In another embodiment, an image generating system for generating composite image data includes a first vehicle including a camera, network interface hardware, and a processor and a non-transient processor readable memory module storing one or more processor executable instruction sets. When executed by the processor, the processor executable instruction sets cause the first vehicle to establish an external connection with a second vehicle, generate a triggering event signal in response to a triggering event, send the triggering event signal to the second vehicle, and capture first image data using the camera in response to the triggering event signal.

In yet another embodiment, a vehicle includes a camera, network interface hardware, and a processor and a non-transient processor readable memory module storing one or more processor executable instruction sets. When executed by the processor, the processor executable instruction sets cause the vehicle to establish an edge server connection with an edge computing device, generate a triggering event signal in response to a triggering event, broadcast the triggering event signal, and capture image data using the camera in response to the triggering event signal.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
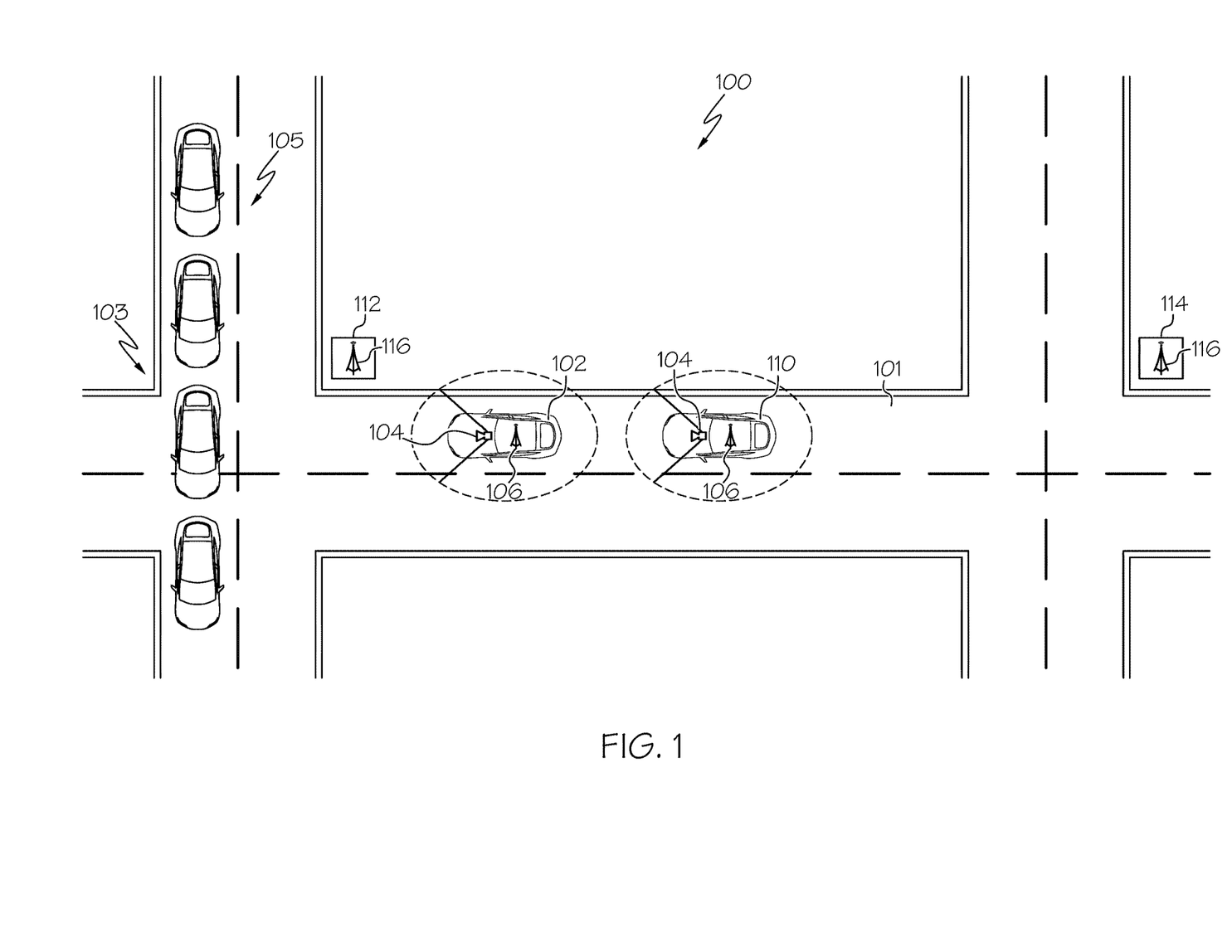
FIG. 1 depicts a scenario in which a composite real-time traffic image is generated using vehicle-borne sensors, according to one or more embodiments shown and described herein.

FIG. 1 generally depicts one embodiment of a system for generating composite real-time traffic images based on triggering events using data from vehicle-borne sensors. The system may include a plurality of vehicle-borne sensors (e.g., cameras) on a plurality of vehicles that may be communicatively coupled via an external connection (e.g., a vehicle-to-vehicle ("V2V") connection). The vehicles may transmit and/or receive visual and other data generated by the sensors and other systems on the vehicles to generate an image of a traffic pattern in the vicinity of the vehicles. In some embodiments, the vehicles may connect with an external processing system, such as an edge computing device. The vehicles generate visual data and other data using their respective on-board sensors (e.g., cameras). The vehicles process the generated data and/or transmit the generated data to an external processor. The visual data and other data may be stitched into a composite real-time traffic image. Various embodiments of the systems and methods for generating composite real-time traffic images using vehicle-borne sensors is described in greater detail herein.

Figure 2:
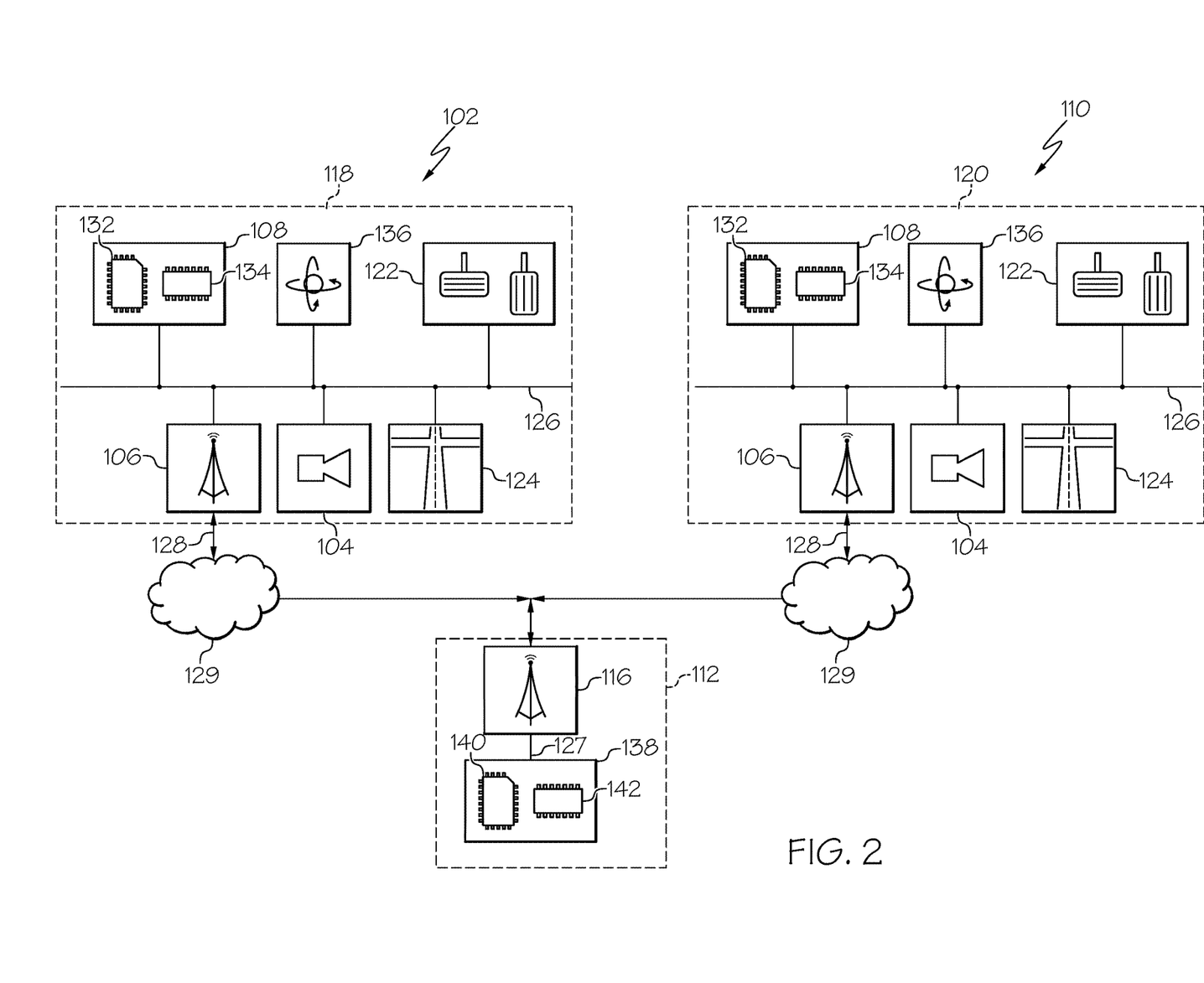
FIG. 2 depicts a system schematic for generating composite real-time traffic images using vehicle-borne sensors, according to one or more embodiments shown and described herein.

Referring now to FIG. 1, an image generating system 100 for generating a composite real-time traffic image is depicted. The composite real-time traffic image may include visual data recorded by one or more vehicles on a roadway or in other places where vehicles may operate (e.g., parking garage, etc.). FIG. 1 depicts a first vehicle 102 and a second vehicle 110 on a roadway 101. The first vehicle 102 or the second vehicle 110 may be an automobile or any other passenger or non-passenger vehicle such as, for example, a terrestrial, aquatic, and/or airborne vehicle. In some embodiments, the first vehicle 102 or the second vehicle 110 is an autonomous vehicle that navigates its environment with limited human input or without human input. The first vehicle 102 and the second vehicle 110 are approaching an intersection 103 through which a line of traffic 105 passes. The first vehicle 102 and the second vehicle 110 are recording visual data with a camera 104 and a second camera that may be substantially similar to the camera 104. Each of the first vehicle 102 and the second vehicle 110 further includes network interface hardware 106 and an electronic control unit ("ECU") 108 (FIG. 2). The camera 104, network interface hardware 106, and ECU 108 are described in greater detail herein with respect to FIG. 2.

The image generating system 100 may also include a first edge computing device 112 that includes network interface hardware 116. The first edge computing device 112 may include a processor 140 (FIG. 2) and one or more memory modules for storing processor-readable instructions as described in greater detail with respect to FIG. 2. In some embodiments, the first edge computing device 112 may be a roadside unit ("RSU"). In some embodiments, the image generating system 100 may include a second edge computing device 114. The second edge computing device 114 may further include network interface hardware 116. In some embodiments, the second edge computing device 114 may be an RSU. The first edge computing device 112 and the second edge computing device 114 may maintain a data connection with one another via the network interface hardware 116 and may be a part of a larger network of computing devices (e.g., a grid computing network). In some embodiments, the first vehicle 102 and the second vehicle 110 establish an edge server connection with one or more of the first edge computing device 112 and the second edge computing device 114 using the network interface hardware 106 of the first vehicle 102 and the second vehicle 110 and the network interface hardware 116 of the first edge computing device 112 and the second edge computing device 114.

The first vehicle 102, the second vehicle 110, the first edge computing device 112, and the second edge computing device 114 may form data connections with one another via their respective network interface hardware 106, 116. The first vehicle 102, the second vehicle 110, the first edge computing device 112, and the second edge computing device 114 may transmit image data and other data over the data connections.

Referring now to FIGS. 1 and 2, additional features and details of the image generating system 100 are described. FIG. 2 is a schematic showing the various systems of each of the first vehicle 102 and the second vehicle 110 of FIG. 1. It is to be understood that the first vehicle 102 and the second vehicle 110 are not limited to the systems and features shown in FIG. 2 and that each may include additional features and systems. As shown, the first vehicle 102 includes a data unit 118 for generating, processing, and transmitting data. The second vehicle 110 may include a second data unit 120 which may be substantially similar to the data unit 118.

The data unit 118 may include the ECU 108, the network interface hardware 106, the camera 104, a brake sensor 122, and a navigation module 124 that may be connected by a communication path 126. The network interface hardware 106 may connect the first vehicle 102 to external systems via an external connection 128. For example, the network interface hardware 106 may connect the first vehicle 102 to one or more other vehicles directly (e.g., a direct connection to the second vehicle 110) or to an external network such as a cloud network 129.

Still referring to FIGS. 1 and 2, the ECU 108 may be any device or combination of components comprising a processor 132 and a non-transitory processor readable memory module 134. The processor 132 may be any device capable of executing a processor-readable instruction set stored in the non-transitory processor readable memory module 134. Accordingly, the processor 132 may be an electric controller, an integrated circuit, a microchip, a computer, or any other computing device. The processor 132 is communicatively coupled to the other components of the data unit 118 by the communication path 126. Accordingly, the communication path 126 may communicatively couple any number of processors 132 with one another, and allow the components coupled to the communication path 126 to operate in a distributed computing environment. Specifically, each of the components may operate as a node that may send and/or receive data. While the embodiment depicted in FIG. 2 includes a single processor 132, other embodiments may include more than one processor.

The non-transitory processor readable memory module 134 is coupled to the communication path 126 and communicatively coupled to the processor 132. The non-transitory processor readable memory module 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory processor readable memory module 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory processor readable memory module 134, other embodiments may include more than one memory module.

Still referring to FIGS. 1 and 2, one or more cameras, such as the camera 104, are coupled to the communication path 126 and communicatively coupled to the processor 132. While the particular embodiment depicted in FIGS. 1 and 2 shows an icon with one camera and reference is made herein to "camera" in the singular with respect to the data unit 118, it is to be understood that this is merely a representation and embodiments of the system may include one or more cameras having one or more of the specific characteristics described herein.

The camera 104 may be any device having an array of sensing devices capable of detecting radiation in an ultraviolet wavelength band, a visible light wavelength band, or an infrared wavelength band. The camera 104 may have any resolution. In some embodiments, one or more optical components, such as a mirror, fish-eye lens, or any other type of lens may be optically coupled to the camera 104. In embodiments described herein, the camera 104 may provide image data to the ECU 108 or another component communicatively coupled to the communication path 126. The image data may include image data of the environment around the first vehicle 102. In some embodiments, for example, in embodiments in which the first vehicle 102 is an autonomous or semi-autonomous vehicle, the camera 104 may also provide navigation support. That is, data captured by the camera 104 may be used by the navigation module 124 to autonomously or semi-autonomously navigate the first vehicle 102.

The camera 104 may operate in the visual and/or infrared spectrum to sense visual and/or infrared light. Additionally, while the particular embodiments described herein are described with respect hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image.

In operation, the camera 104 captures image data and communicates the image data to the ECU 108 and/or to other systems communicatively coupled to the communication path 126. The image data may be received by the processor 132, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

The network interface hardware 106 may be coupled to the communication path 126 and communicatively coupled to the ECU 108. The network interface hardware 106 may be any device capable of transmitting and/or receiving data with external vehicles or servers directly or via a network, such as the cloud network 129. Accordingly, network interface hardware 106 can include a communication transceiver for sending and/or receiving any wired or wireless communication. For example, the network interface hardware 106 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 106 may include hardware configured to operate in accordance with the Bluetooth wireless communication protocol and may include a Bluetooth send/receive module for sending and receiving Bluetooth communications.

In some embodiments, the first vehicle 102 may be communicatively coupled to a network such as the cloud network 129. In embodiments, the cloud network 129 may include one or more computer networks (e.g., a personal area network, a local area network, grid computing network, wide area network, etc.), cellular networks, satellite networks and/or a global positioning system and combinations thereof. Accordingly, the first vehicle 102 can be communicatively coupled to the cloud network 129 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Referring to FIGS. 1 and 2, in embodiments, the first vehicle 102 may connect with one or more external vehicles (e.g., the second vehicle 110) and/or external processing devices (e.g., the first edge computing device 112) via a direct connection. The direct connection may be a vehicle-to-vehicle connection ("V2V connection"). The V2V connection may be established using any suitable wireless communication protocols discussed above. A connection between vehicles may utilize sessions that are time and/or location-based. In embodiments, a connection between vehicles may utilize one or more networks to connect (e.g., the cloud network 129), which may be in lieu of, or in addition to, a direct connection (such as V2V) between the vehicles. By way of non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure (e.g., the first edge computing device 112). Still other examples include networks using centralized servers and other central computing devices to store and/or relay information between vehicles.

Referring to FIG. 2, the brake sensor 122 may generate a brake pedal signal based on a position, a speed, and/or an acceleration of the depression of a brake pedal and/or an acceleration pedal of the first vehicle 102. The brake sensor 122 may transmit the brake pedal signal to the ECU 108. The ECU 108 may receive the brake pedal signal and cause the data unit 118 to capture visual data or other data based on the brake pedal signal as described in greater detail herein. In some embodiments, an external connection with one or more external vehicles and/or external computing infrastructures may be formed based on the brake pedal signal and/or data may be transmitted or requested by the first vehicle 102 based on the brake pedal signal. In embodiments, the brake sensor 122 may be a positional sensor that alters an electrical output based on a position, velocity, or acceleration of a brake pedal. In some embodiments, the brake sensor 122 may be electronically coupled to the vehicle brakes and may alter an electrical output based on a position, velocity, or acceleration of one or more components of the vehicle brakes.

In embodiments, the data unit 118 may include one or more motion sensors 136 for detecting and measuring motion and changes in motion of the first vehicle 102. Each of the one or more motion sensors 136 is coupled to the communication path 126 and communicatively coupled to the one or more processors 132. The motion sensors 136 may include inertial measurement units. Each of the one or more motion sensors 136 may include one or more accelerometers and one or more gyroscopes. Each of the one or more motion sensors 136 transforms sensed physical movement of the first vehicle 102 into a signal indicative of an orientation, a rotation, a velocity, or an acceleration of the first vehicle 102.

In embodiments, the data unit 118 may include the navigation module 124. The navigation module 124 may be configured to obtain and update positional information of the first vehicle 102 and to display such information to one or more users of the first vehicle 102. The navigation module 124 may be able to obtain and update positional information based on geographical coordinates (e.g., latitudes and longitudes), or via electronic navigation where the navigation module 124 electronically receives positional information through satellites. In certain embodiments, the navigation module 124 may include a GPS system.

The components of the second data unit 120 of the second vehicle 110 are exactly the same as the components of the data unit 118 of the first vehicle 102.

Referring to FIGS. 1 and 2, the first edge computing device 112 may include the network interface hardware 116 which may be communicatively coupled to a control unit 138 including a processor 140 and a non-transitory processor readable memory module 142 via a communication path 127.

The network interface hardware 116 may be coupled to the communication path 127 and communicatively coupled to the control unit 138. The network interface hardware 116 may be any device capable of transmitting and/or receiving data with external vehicles or servers directly or via a network, such as the cloud network 129. Accordingly, network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 116 may include hardware configured to operate in accordance with the Bluetooth wireless communication protocol and may include a Bluetooth send/receive module for sending and receiving Bluetooth communications.

The control unit 138 may include the processor 140 and the non-transitory processor readable memory module 142. The processor 140 may be any device capable of executing the processor-readable instruction set stored in the non-transitory processor readable memory module 142. Accordingly, the processor 140 may be an electric controller, an integrated circuit, a microchip, a computer, or any other computing device. The processor 140 is communicatively coupled to the communication path 127. Accordingly, the communication path 127 may communicatively couple any number of processors 140 with one another, and allow the components coupled to the communication path 127 to operate in a distributed computing environment. Specifically, each of the components may operate as a node that may send and/or receive data. While the embodiment depicted in FIG. 2 includes a single processor 140, other embodiments may include more than one processor.

The non-transitory processor readable memory module 142 is coupled to the communication path 127 and communicatively coupled to the processor 140. The non-transitory processor readable memory module 142 may comprise RAM, ROM, flash memories, hard drives, or any non-transitory memory device capable of storing machine-readable instructions such that the machine-readable instructions can be accessed and executed by the processor 140. The machine-readable instruction set may comprise logic or algorithm(s) written in any programming language of any generation (e.g., 1GL, 2GL, 3GL, 4GL, or 5GL) such as, for example, machine language that may be directly executed by the processor 140, or assembly language, object-oriented programming (OOP), scripting languages, microcode, etc., that may be compiled or assembled into machine readable instructions and stored in the non-transitory processor readable memory module 142. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory processor readable memory module 142, other embodiments may include more than one memory module.

Figure 3:
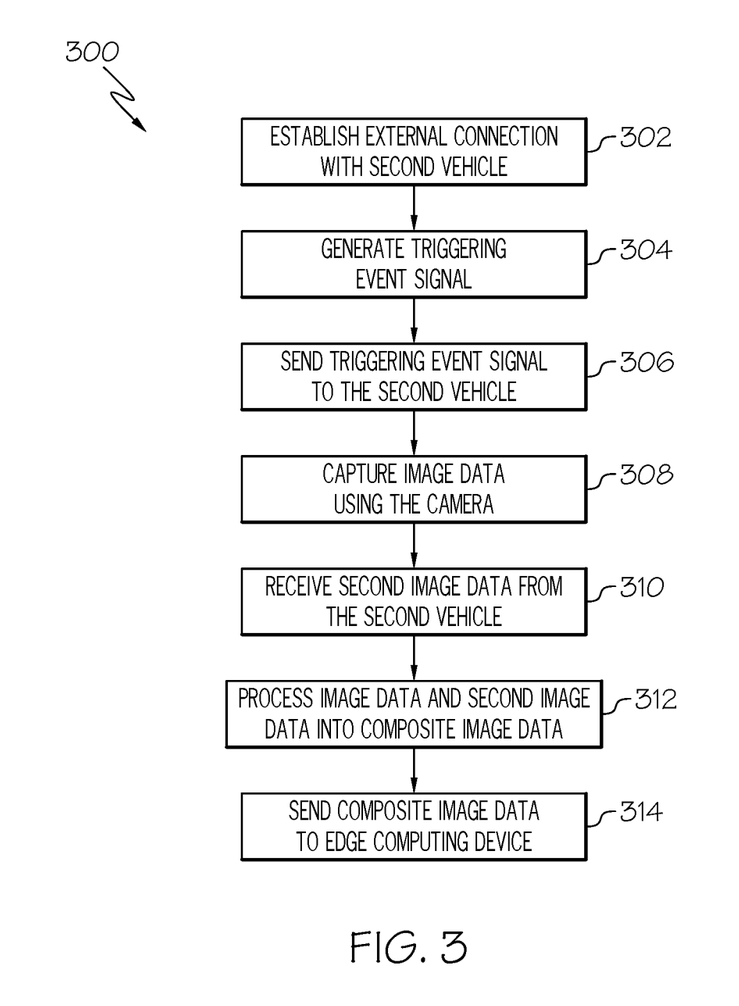
FIG. 3 depicts a flow chart showing one embodiment of a method of generating composite real-time traffic images based on a triggering event using data from vehicle-borne sensors, according to one or more embodiments shown and described herein.

Referring now to FIGS. 1 and 3, a flow chart depicting one embodiment of a method 300 of generating composite real-time traffic images based on a triggering event using data from vehicle-borne sensors is described in greater detail. It is to be understood that the particular steps described with respect to FIG. 3 are merely one exemplary embodiment and that other implementations and embodiments of the method 300 are contemplated.

The term "triggering event" is used herein to refer to one or more events that cause the first vehicle 102 and/or the second vehicle 110 to capture visual and/or other data using their respective vehicle-borne sensors (e.g., the camera 104). In embodiments, a triggering event may refer to, for example, a rapid application of vehicle brakes (e.g., of the first vehicle 102 and/or the second vehicle 110), as sensed by the brake sensor 122 (FIG. 2) or motion sensors 136 (FIG. 2), which causes the first vehicle 102 to rapidly decelerate. In embodiments, a triggering event may refer to a rapid deceleration, as measured by the motion sensors 136 (FIG. 2) or another device, the magnitude of which is above a predetermined threshold, such that given an above-threshold deceleration, the first vehicle 102 and/or the second vehicle 110 begin to capture image and/or other sensor data for processing to generate a composite real-time traffic image. In yet other embodiments, the triggering event may be based upon a proximity of a vehicle external to the detecting vehicle (e.g., the proximity of the line of traffic 105 to the first vehicle 102, or the proximity of the first vehicle 102 to the second vehicle 110 in FIG. 1), such that the detecting vehicle begins to record visual data when it encounters a situation in which a relative increase in the amount of traffic is possible. In some embodiments, a triggering event may refer to a condition of a road itself or to a condition of the external environment generally. For example, moisture in the air or on the roadway 101 may be a triggering event. In some embodiments, the grid network may be configured to determine (e.g., by estimation as determined based on visual or other data) the number of vehicles on the roadway 101. A triggering event may occur if the number of vehicles on the roadway 101 exceeds a triggering event threshold number of vehicles.

At step 302, the first vehicle 102 may establish an external connection with the second vehicle 110. In some embodiments, the first vehicle 102 may also establish an external connection with one or more of the first edge computing device 112, and the second edge computing device 114. In some embodiments, the first vehicle 102 may not establish the external connection until after a triggering event (described in greater detail below) has occurred or the first vehicle 102 may establish the external connection before the occurrence of a triggering event. For example, the first vehicle 102 may establish an external connection with the second vehicle 110, the first edge computing device 112, and/or the second edge computing device 114 based on proximity to one another, based on a particular time within a proximity to one another, based on one or more shared characteristics of the first vehicle 102 and the second vehicle 110 (e.g.: make, model, vehicle type; destination, speed, acceleration; social network credentials; etc.), or based on some other criteria. For example, network connection sessions may be perpetual based on proximity and/or a quality of service ("QoS") of a connection between the first vehicle 102 and one or more of the second vehicle 110, the first edge computing device 112, and the second edge computing device 114. In other embodiments, the establishment of a network session may be on-demand based on one or more criteria, for example, based on a user selection or permission level, a sensed condition of the vehicle (e.g., vehicle speed/acceleration profiles), or the generation of a triggering event as described in greater detail herein.

At step 304, the first vehicle 102 may generate a triggering event signal in response to the triggering event described above. The triggering event signal may be a detectable physical quantity or impulse (such as a voltage, current, or magnetic field strength) that transmits information or data and is generated in response to a triggering event, e.g., a rapid application of vehicle brakes, a rapid deceleration of the vehicle, etc. For example, the first vehicle 102 may generate a brake signal based on a rapid application of vehicle brake sensed by the brake sensor 122 (FIG. 2) or may rapidly decelerate and generate a deceleration signal using the motion sensors 136. The magnitude of the deceleration may be measured and compared to a deceleration threshold. The magnitude of the deceleration may be measured by the motion sensors 136 (FIG. 2) and or may be estimated based on a braking signal generated by the brake sensor 122. In some embodiments, the brake sensor 122 may measure the position, speed, or acceleration of the brake pedal with reference to a base position (e.g., a neutral or "non-depressed" position) and generate a triggering event signal based on the magnitude of the braking signal. The triggering event signal may also be used as a trigger to cause one or more additional steps to occur as described in greater detail herein.

At step 306, the first vehicle 102 may send the triggering event signal to the second vehicle 110. The triggering event signal may be sent over the external connection with the second vehicle 110 via a message transferred from the network interface hardware 106 of the first vehicle 102 to the network interface hardware of the second vehicle 110. The first vehicle 102 may send the triggering event signal to cause the second vehicle 110 to capture visual data.

At step 308, the first vehicle 102 may begin to capture image data using the camera 104 based on the triggering event signal. That is, the triggering event signal may activate the camera 104 such that the camera 104 begins to generate visual data of the surrounding environment. The image data may include image data of the one or more vehicles surrounding the first vehicle 102 such that the first vehicle 102 can develop a real-time traffic picture based on the image data as described in greater detail herein. It is to be understood that, while methods are described herein with respect to the capture of image data, other types of data capture are contemplated. For example, the first vehicle 102 may capture LIDAR, radar, and/or sonar data externally or internally from the vehicle. In some embodiments, the first vehicle 102 may capture intrinsic data, for example, speed, acceleration, position data from one or more intrinsic sensors (e.g., speedometers, tachometers, GPS in the navigation module 124, etc.). This other data may be used to supplement the visual data captured by the camera 104. Additionally, the first vehicle 102 may capture and/or record metadata related to the visual and other data (e.g., time stamps, location stamps, etc.). The metadata may be used to process and organize the data into composite data as described in greater detail herein.

At step 310, the first vehicle 102 may receive second image data from the second vehicle 110. The second vehicle 110 may begin capturing image data in response to the triggering event signal of the first vehicle 102 and may send that image data to the first vehicle 102. The second vehicle 110 may capture image data similarly to the first vehicle 102 (i.e., using the camera 104 on the second vehicle 110) and may similarly capture supplemental data and metadata as described with respect to the first vehicle 102.

At step 312, the first vehicle 102 may process the image data captured by the camera 104 of the first vehicle 102 and the second image data to generate a composite real-time traffic image. The composite real-time traffic image may include overlapping fields of view based on the images produced by the first vehicle 102 and the second vehicle 110. The overlapping fields of view may produce a segmented panorama or high-resolution image. In some embodiments, the image data may be processed with a high dynamic range of imaging in ranges of overlap. In embodiments, the processor 132 may determine a mathematical model relating the pixel coordinates in an image generated by the first vehicle 102 to the pixel coordinates in an image generated by the second vehicle 110 to align the images. The image data may be time stamped by both the first vehicle 102 and the second vehicle 110 such that the image data from the respective vehicles may sync. Once the images are aligned, pixel-to-pixel comparisons may be conducted to estimate the correct alignments of the images. Gradient descent and other optimization techniques may be used to enhance the alignment techniques. In some embodiments, the images or portions thereof may be segmented and classified to align distinctive features in each set of image data. Keypoint detection may be used to automatically find correspondences between image features by searching for, for example, corners, blobs, Harris corners, and differences of Gaussian of Harris corners (DoG). In some embodiments, SIFT and SURF algorithms may be used to detect keypoints. Once detected, keypoints may be assigned a descriptor using a descriptor method such as SIFT descriptor and the keypoints may be matched using the descriptor.

In some embodiments, the images may be stitched onto a composite surface that may be selected to account for variations in parallax, lens distortion, scene motion, and exposure. The images may be warped or projectively transformed onto the composite surface. The images may be registered, calibrated, aligned, composited, and/or blended to generate the composite real-time image.

At step 314, the first vehicle 102 may send the composite image data to the first edge computing device 112. With reference to FIGS. 1, 2, and 3, the first edge computing device 112 may upload the composite image data to an external network such as the cloud network 129 and/or may perform further processing of the composite image data. In some embodiments, the image processing may be distributed amongst one or more of the first vehicle 102, the second vehicle 110, the first edge computing device 112, the second edge computing device 114, or the cloud network 129. In some embodiments, the first edge computing device 112 and the second edge computing device 114 (collectively, "the edge computing devices") are edge computing devices on the edge of the cloud network 129, such that the edge computing devices are in computational contact between the cloud network 129 and the first vehicle 102 and the second vehicle 110 (collectively, "the vehicles"). By performing the computational processes associated with stitching the images at the edge computing devices communications bandwidth between systems under the cloud network 129 may be reduced. Thus, the proximity between the edge computing devices and the vehicles may be leveraged to decrease latency and increase processing power near the actual source of the data. The composite image data may be sent to the navigation module 124 and/or displayed on one or more displays within the first vehicle 102 such that users of the first vehicle 102 can view the real-time traffic image.

In some embodiments, vehicles may opt to receive some of the computational burden of stitching the images in exchange for access to the final stitched image or traffic data in a sort of market for exchanging computational resources for useful information. For example, vehicles may agree to process image data in exchange for access to the composite image data whether they generated any of the image data or not. In some embodiments, vehicles may pay some fee or trade some resource for access to the composite image data.

Figure 4:
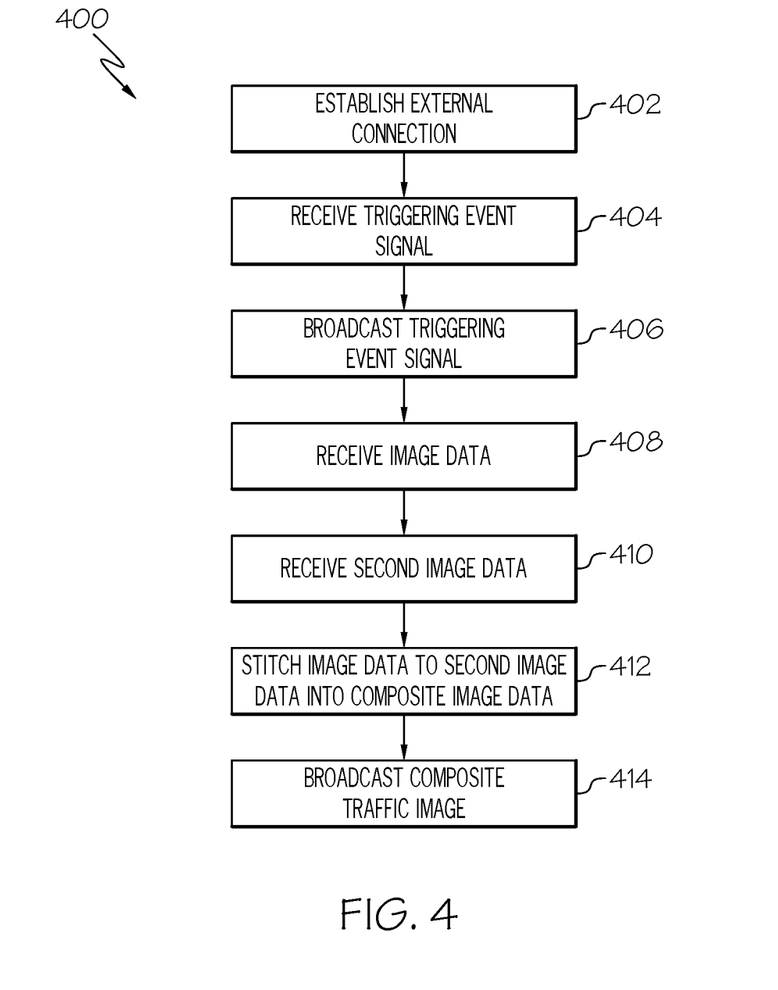
FIG. 4 depicts a flow chart showing another embodiment of a method of generating composite real-time traffic images based on a triggering event using data from vehicle-borne sensors, according to one or more embodiments shown and described herein.

Referring now to FIGS. 1, 2, and 4, another embodiment for a process of generating composite image data is described from the view point of an edge computing device, such as the first edge computing device 112 of FIG. 1. In the method 400, at step 402, the first edge computing device 112 may establish an external connection with one or more of the first vehicle 102 and the second vehicle 110. The external connection may be used to transfer image data and other data captured and/or generated by the first vehicle 102 and the second vehicle 110 as described in greater detail herein. The external connection may be made using the network interface hardware 116. The external connection may be made via a wireless signal such as a Bluetooth or 5G connection with communications equipment on the first vehicle 102 or the second vehicle 110 such as the network interface hardware 106.

At step 404, the first edge computing device 112 may receive a triggering event signal. The triggering event signal may be generated by the first vehicle 102 and/or the second vehicle 110, for example, in response to a braking signal or a deceleration, as described herein.

At step 406, the first edge computing device 112 may then broadcast the triggering event signal to other vehicles that are connected with the first edge computing device 112. For example, if the first edge computing device 112 receives the triggering event signal from the first vehicle 102, the first edge computing device 112 may relay the triggering event signal to the second vehicle 110 such that the second vehicle 110 can take appropriate actions based on the triggering event signal (e.g., begin recording image data). Conversely, if the first edge computing device 112 receives the triggering event signal from the second vehicle 110, it may relay the triggering event signal to the first vehicle 102. In some embodiments, the first edge computing device 112 may broadcast the triggering event signal passively, in addition to or rather than sending the triggering event signal to specific connections (e.g., over the connection with individual vehicles such as the second vehicle 110). Other vehicles within a broadcast proximity of the first edge computing device 112 may be configured to identify the triggering event signal and may establish a connection with the first edge computing device 112 based on detection of the generally-broadcast triggering event signal.

At step 408, the first edge computing device 112 may receive image data and other data from the first vehicle 102. The first edge computing device 112 may receive the image data and other data via a connection created using the network interface hardware 116. The image data may be generated by the first vehicle 102 after it generates or receives the triggering event signal. For example, if the first vehicle 102 experiences a rapid braking condition exceeding a particular braking threshold, the first vehicle 102 may generate a triggering event signal and may begin to capture image data. This image data may be transmitted to the first edge computing device 112 via a connection with the first edge computing device 112.

At step 410, the first edge computing device 112 may receive second image data and other data from the second vehicle 110 via the network interface hardware 116. The first edge computing device 112 may receive the second image data and other data via a connection created using the network interface hardware 116. The second image data may be generated by the second vehicle 110 after it generates or receives the triggering event signal. For example, if the first vehicle 102 experiences a rapid braking condition exceeding a particular braking threshold, the first vehicle 102 may generate a triggering event signal and the second vehicle 110 may receive the triggering event signal (either directly from the first vehicle 102 or relayed by some other communication means (e.g., the first edge computing device 112)) and may begin to capture image data based on receiving the triggering event signal. This second image data may be transmitted to one or more of the first vehicle 102 and the first edge computing device 112 via a connection with the first vehicle 102 and/or the first edge computing device 112.

At step 412, the first edge computing device 112 may process the image data and the second image data into composite real-time image data as described herein. The composite real-time image data may include overlapping fields of view based on the images produced by the first vehicle 102 and the second vehicle 110. The overlapping fields of view may produce a segmented panorama or high-resolution image. In some embodiments, the image data may be processed with a high dynamic range of imaging in ranges of overlap. In embodiments, the processor 140 may determine a mathematical model relating the pixel coordinates in an image generated by the first vehicle 102 to the pixel coordinates in an image generated by the second vehicle 110 to align the images. The image data may be time stamped by both the first vehicle 102 and the second vehicle 110 such that the image data from the respective vehicles may sync. Once the images are aligned, pixel-to-pixel comparisons may be conducted to estimate the correct alignments of the images. Gradient descent and other optimization techniques may be used to enhance the alignment techniques. In some embodiments, the images or portions thereof may be segmented and classified to align distinctive features in each set of image data. Keypoint detection may be used to automatically find correspondences between image features by searching for, for example, corners, blobs, Harris corners and differences of Gaussian of Harris corners (DoG). In some embodiments, SIFT and SURF algorithms may be used to detect keypoints. Once detected, keypoints may be assigned a descriptor using a descriptor method such as SIFT descriptor and the keypoints may be matched using the descriptor.

At step 414, the first edge computing device 112 may broadcast the stitched or composite image data to one or more vehicles (e.g., the first vehicle 102, the second vehicle 110, etc.) that are within a communication range of the first edge computing device 112 that are communicatively coupled with the first edge computing device 112. In some embodiments, the first edge computing device 112 may upload the composite image data to the cloud network 129 or may transmit the composite image data to the second edge computing device 114 for further processing or for further dissemination. In some embodiments, the second edge computing device 114 may combine the composite image data with composite image data generated by vehicles within a communication radius of the second edge computing device 114 and processed by the second edge computing device 114. In some embodiments, the first edge computing device 112 may send the composite image data to one or more vehicles within a communications radius of the first edge computing device 112 based on whether or not the particular vehicle has agreed to participate in the processing and/or stitching of composite images in order to incentivize processing of data by vehicles.

Referring now to FIG. 1, a scenario in which the first vehicle 102 and the second vehicle 110 generate composite real-time traffic images based on triggering events using data from vehicle-borne sensors is described. In FIG. 1, the first vehicle 102 is approaching the intersection 103. In the particular scenario depicted, the first vehicle 102 has the right of way to pass through the intersection 103; however, the traffic 105 has blocked the intersection 103. The first vehicle 102 rapidly approaches the intersection 103 and must rapidly apply its brakes to stop from entering the intersection 103 while a line of traffic 105 is in the intersection 103.

The first vehicle 102 rapidly applies its brakes, generating a brake signal that exceeds a threshold to trigger a triggering event signal. Accordingly, the first vehicle 102 generates a triggering event signal. Simultaneously, the first vehicle 102 sends a request to the first edge computing device 112 to establish a data transfer connection to send data to the first edge computing device 112. The first edge computing device 112 accepts the request and the first vehicle 102 and the first edge computing device 112 establish a data transfer connection.

Additionally, the first vehicle 102 activates its camera 104 and begins to generate and record visual data and other data associated with the visual data (e.g., metadata, etc.). The visual data may be recorded in the non-transitory processor readable memory module 134 of the first vehicle 102 and/or sent to one or more of the first edge computing device 112, the second vehicle 110, and the cloud network 129 using the network interface hardware 106.

Once the first edge computing device 112 receives the triggering event signal from the first vehicle 102, the first edge computing device 112 may broadcast the triggering event signal to other vehicles that are in communication with the first edge computing device 112 or are within a communication radius of the first edge computing device 112. Accordingly, the first edge computing device 112 may send the triggering event signal to the second vehicle 110 and the second vehicle 110 may begin to generate and record visual data and other data once the second vehicle 110 receives the triggering event signal. In some embodiments, the triggering event signal may be sent directly from the first vehicle 102 to the second vehicle 110 via a connection between the two.

The second vehicle 110 may send the visual and other data generated by the second vehicle 110 to one or more of the first vehicle 102, the first edge computing device 112, and the cloud network 129. In the particular embodiment shown in FIG. 1, both the first vehicle 102 and the second vehicle 110 send data to the first edge computing device 112. The first edge computing device 112 generates a composite image from the data generated by the first vehicle 102 and the second vehicle 110 and uploads the composite image to the cloud network 129 where it can be accessed by multiple users (e.g., the first vehicle 102, the second vehicle 110, etc.). For example, the composite image data may be accessed by one or more users and be used to update a navigation module, e.g. the navigation module 124 of the first vehicle 102. The composite image data may offer a user of the navigation module 124 a composite, real-time traffic image based on a triggering event that is generated by vehicle-borne sensors.

It should now be understood that vehicles may include vehicle-borne sensors (e.g., cameras) for capturing image data of traffic scenarios and network interface hardware for uploading such image data to one or more external computing devices. Image data from multiple vehicles may be processed into a single composite image. The commencement of image data capture may be based on one or more triggering events. Accordingly, real-time composite traffic images may provide current traffic information only when necessary, thus not over-burdening computational resources with processor-intensive tasks such as image processing when traffic is light or negligible.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of generating composite image data using a first vehicle including a first camera and first network interface hardware and a second vehicle including a second camera and second network interface hardware, the method comprising:

establishing an external connection between the first vehicle and the second vehicle with the first network interface hardware and the second network interface hardware;

generating a triggering event signal in the first vehicle in response to a triggering event;
sending the triggering event signal to the second vehicle;
capturing first image data using the first camera and capturing second image data using the second camera; and
stitching the first image data and the second image data into the composite image data.

2. The method of claim 1, wherein capturing the first image data and capturing the second image data is based on the triggering event signal.

3. The method of claim 2, wherein the triggering event signal is a braking signal.

4. An image generating system for generating composite image data, the image generating system comprising:
a first vehicle comprising:
a camera;
network interface hardware; and
a processor and a non-transitory processor readable memory module storing one or more processor executable instruction sets that when executed by the processor cause the first vehicle to:
establish an external connection with a second vehicle;
generate a triggering event signal in response to a triggering event;
send the triggering event signal to the second vehicle; and
capture first image data using the camera in response to the triggering event signal.

5. The system of claim 4, wherein the first vehicle establishes the external connection with the second vehicle based on the triggering event.

6. The system of claim 4, wherein generation of the triggering event signal is based on a braking signal caused by braking of the first vehicle.

7. The system of claim 4, wherein:
the second vehicle comprises:
a second camera;
second network interface hardware; and
a second processor and a second non-transitory processor readable memory module storing one or more processor executable instruction sets that when executed by the second processor cause the second vehicle to:
recognize the triggering event signal; and
capture second image data using the second camera in response to the triggering event signal.

8. The system of claim 7, wherein the second vehicle sends the second image data to the first vehicle and the first vehicle stitches the first image data and the second image data to create the composite image data.

9. The system of claim 7, wherein one or more of the first vehicle and the second vehicle establish an edge server connection with an edge computing device and one or more of the first vehicle and the second vehicle send the first image data and the second image data over the edge server connection to the edge computing device.

10. The system of claim 9, wherein the edge computing device generates the composite image data based on the first image data and the second image data.

11. The system of claim 9, wherein the second vehicle sends the second image data to the first vehicle and the first vehicle sends the second image data and the first image data to the edge computing device.

12. The system of claim 11, wherein the first vehicle stitches the second image data and the first image data into the composite image data and sends the composite image data to the edge computing device.

13. A vehicle comprising:
a camera;
network interface hardware; and
a processor and a non-transitory processor readable memory module storing one or more processor executable instruction sets that when executed by the processor cause the vehicle to:
establish an edge server connection with an edge computing device;
generate a triggering event signal in response to a triggering event;
broadcast the triggering event signal; and
capture image data using the camera in response to the triggering event signal.

14. The vehicle of claim 13, wherein generation of the triggering event signal is based on a braking signal caused by braking of the vehicle.

15. The vehicle of claim 13, wherein establishment of the edge server connection is based on proximity between the vehicle and the edge computing device.

16. The vehicle of claim 13, wherein the processor executable instruction sets further cause the vehicle to generate an external connection with a second vehicle.

17. The vehicle of claim 16, wherein the vehicle receives second image data captured by a second camera on the second vehicle.

18. The vehicle of claim 17, wherein the vehicle stitches the image data and the second image data into composite image data and sends the composite image data to the edge computing device over the edge server connection.

19. The vehicle of claim 17, wherein the vehicle stitches the image data and the second image data into composite image data and sends the composite image data to the second vehicle over the external connection.

20. The vehicle of claim 17, wherein the vehicle sends the image data and the second image data to the edge computing device.

* * * * *